US005831855A

United States Patent [19]

Kinsman

[11] Patent Number: 5,831,855

[45] Date of Patent: Nov. 3, 1998

[54] MONITORING SYSTEM FOR ELECTROSTATIC POWDER PAINTING INDUSTRY

[76] Inventor: Guy W. Kinsman, 726 S. Prospero Dr., West Covina, Calif. 91791

[21] Appl. No.: 712,851

[22] Filed: Sep. 12, 1996

[51] Int. Cl.[6] .......... G06F 17/00

[52] U.S. Cl. .......... 364/468.13; 118/686; 118/694; 364/479.1; 364/479.12

[58] Field of Search .......... 364/479.01, 479.03, 364/479.05, 479.09, 479.1, 479.11, 479.12, 479.13, 479.14, 468.01, 468.05, 468.09, 468.13, 468.14; 118/672, 674, 676, 679, 682, 686, 688, 694, 689, 690, 695

[56] References Cited

U.S. PATENT DOCUMENTS

| | | | |
|---|---|---|---|
| Re. 33,054 | 9/1989 | Markham | 235/385 |
| 4,278,046 | 7/1981 | Clarke et al. | 118/695 |
| 4,362,124 | 12/1982 | Fleig | 118/698 |
| 4,452,171 | 6/1984 | Browning | 118/58 |
| 4,467,961 | 8/1984 | Coffee et al. | 239/1 |
| 4,614,300 | 9/1986 | Falcoff | 239/71 |
| 4,736,304 | 4/1988 | Doehler | 364/469 |
| 4,827,395 | 5/1989 | Anders | 364/138 |
| 4,894,252 | 1/1990 | Bongen et al. | 427/8 |
| 4,941,182 | 7/1990 | Patel | 117/697 |
| 5,328,093 | 7/1994 | Feitel | 239/3 |
| 5,389,149 | 2/1995 | Carey et al. | 118/302 |
| 5,423,455 | 6/1995 | Ricciardi et al. | 222/1 |
| 5,481,260 | 1/1996 | Buckler et al. | 340/870.09 |
| 5,556,466 | 9/1996 | Martin et al. | 118/67 |
| 5,718,767 | 2/1998 | Crum et al. | 118/669 |

*Primary Examiner*—Thomas C. Lee
*Assistant Examiner*—Thomas E. Brown
*Attorney, Agent, or Firm*—F. Eugene Logan

[57] ABSTRACT

A system for monitoring an electrostatic powder painting process having a conveyor line adaptable for transporting articles to be electrostatically powder painted sequentially through a plurality of zones in the process. The monitoring system dispenses powder paint particles from a delivery container through a conduit to an electrostatic powder paint spray gun used for applying the powder paint particles to the articles in a painting zone, and senses the weight of the delivery container and powder paint particles therein with a scale device. The scale device generates a paint weight signal corresponding to the real time weight of the delivery container and powder paint particles therein. The monitoring system transmits the paint weight signal from the scale device to a computer-monitor adaptable for displaying the real time weight of the delivery container and powder paint particles therein as a container weight function over a predetermined period of time. The monitoring system senses the speed of the conveyor line with speed sensor which generates a line speed signal corresponding to the real time line speeds and transmits the line speed signal from the speed sensor to the computer-monitor as a line speed function over a predetermined period of time.

20 Claims, 10 Drawing Sheets

MONITORING SYSTEM FOR ELECTROSTATIC POWDER PAINTING INDUSTRY

BACKGROUND OF THE INVENTION

Because of the competition in todays original equipment manufacturers or OEMS, many OEMS find it necessary, or at least cost effective, to have specialists handle certain operations in the manufacture of their products. The electrostatic powder painting operation is one of those steps that many OEMS, which require their metal products to be painted, find is beneficial to have specialists perform. As a consequence there is a growing electrostatic powder painting industry which serves OEMS that need their steel, iron, aluminum and other metal products painted.

The electrostatic powder painting industry is frequently small businesses that are highly competitive. To remain competitive, these small business owners often must personally manage both the business part and the operational part of their business. These business owners must maximize the productivity of their operation and minimize mistakes. Examples of costly mistakes often made are: unnecessary stoppage of the conveyor line, running out of powder, using the wrong powder, wasting powder, having to much of one powder and not enough of another, unaccounted for disappearance of powder, insufficient cleaning and surface activation of the articles received from the OEMS, and insufficient curing of the powder on the articles.

Therefore, there is a need for a system for monitoring electrostatic powder painting processes that allows the business owner to keep track of the operational part of the painting process without being physically present at the conveyor line at all times or most of the time thereby allowing the business owner more time for the business part of the business.

SUMMARY OF THE INVENTION

The monitoring systems of this invention allows the owners or managers to remotely and periodically review operating parameters of their electrostatic powder painting process to quickly see if there is, or has been, a problem such as stoppage of the line, incorrect temperatures, or incorrect pH. If there has been a stoppage, the monitoring system prompts the manager to investigate.

By not requiring a manager's physical presents at the line at all times, or frequently, the manager is free to perform other duties such as phone conferences with customers, review of monitoring system records, discussions with shift supervisors, inventory review, ordering of supplies, and planning schedules and other business activities.

Due to the nature of the powder paint particles, hereinafter referred to as "powder", and the heat from elevated temperature of the large curing ovens, the line is generally a very hot, gritty and a somewhat undesirable area. Consequently frequent trips to the line for periodic inspection can easily interrupt the manager's chain of thought thereby lowering his productivity. Also, business owners generally feel that it is important for them to personally have a professional dress appearance for meeting with customers. Less time in the operations part of the business, where clothing can be easily soiled, facilitates maintaining a clean dress appearance.

In general, the monitoring systems of this invention enable managers to maintain close supervision of the line activities without having to be physically at, or make frequent visits to, the line to insure that there are no problems at the line thereby freeing the manager's time for other important matters.

The manager may also use the information resulting from and produced by the monitoring system of this invention to evaluate the performance of personnel and to discuss with the personnel how performance may be improved. The viewing of the displays and printed records resulting from the monitoring system enables the manager to provide visual proof of good process control to existing and potential customers, and to research problems discovered days, weeks or months after a particular paint job was completed.

Accordingly, there is provided by the principles of this invention a system for monitoring an electrostatic powder painting process having a conveyor line adaptable for transporting articles to be electrostatically powder painted sequentially through a plurality of zones in the process.

The system comprises dispensing powder paint particles from a delivery container through a conduit to an electrostatic powder paint spray gun operable for applying the powder paint particles to the articles in a painting zone, sensing the weight of the delivery container and powder paint particles therein with scale means and generating a paint weight signal therewith corresponding to the real time weight of the delivery container and powder paint particles therein, and transmitting the paint weight signal from the scale means to computer-monitor means adaptable for displaying the real time weight of the delivery container and powder paint particles therein as a container weight function over a predetermined period of time.

The system further comprises sensing the speed of the conveyor line with speed sensing means and generating a line speed signal therewith corresponding to the real time line speed, and transmitting the line speed signal from the speed sensing means to computer-monitor means adaptable for displaying the real time line speed as a line speed function over a predetermined period of time.

In a further embodiment, the computer-monitor means for displaying the container weight function is also adaptable for converting the paint weight signal into a powder used function corresponding to the total weight of powder removed from the delivery container and for displaying the real time weight of the powder used as a powder used function over a predetermined period of time. In a still further embodiment, the computer-monitor means for displaying the container weight function and for displaying the powder used function displays the powder used function superimposed over the container weight function.

In one embodiment, the predetermined period of time for displaying the container weight function spans at least about 1 hour, and wherein the predetermined period of time for displaying the line speed function also spans at least about 1 hour.

In another embodiment, the predetermined period of time for displaying the line speed function is equal to, and corresponds to, the predetermined period of time for displaying the container weight function.

In still another embodiment, the container weight function includes a short term container weight function and a long term container weight function, and the line speed function includes a short term line speed function and a long term line speed function. In a further embodiment, the short term container weight function and the short term line speed function each span at least about 1 hour, and wherein the long term container weight function and the long term line speed function each span at least about 8 hours. In a still further embodiment, the long term container weight function and the long term line speed function each span at least about 12 hours.

In one embodiment, the process also comprises a precleaning-surface activation zone wherein the articles are precleaned and surfaced activated with a recycled cleaning-surface activation solution before painting, and the system further comprises sensing the pH of the recycled cleaning-surface activation solution with pH measuring means and generating a pH signal therewith corresponding to the real time pH of the recycled cleaning-surface activation solution, and transmitting the pH signal from the pH measuring means to computer-monitor means adaptable for displaying the real time pH of the recycled cleaning-surface activation solution as a pH function over a predetermined period of time.

In another embodiment, the process also comprises a curing zone wherein the articles after being painted are subjected to an elevated temperature to bond the powder paint particles to the articles, and the system further comprises sensing the elevated temperature in the curing zone with temperature sensing means and generating a temperature signal therewith corresponding to the real time elevated temperature in the curing zone, and transmitting the temperature signal from the temperature sensing means to computer-monitor means adaptable for displaying the real time temperature of the curing zone as a temperature function over a predetermined period of time.

In a further embodiment, the process also comprises a curing zone wherein the articles after being painted are subjected to an elevated temperature to bond the powder paint particles to the articles, and the system further comprises sensing the elevated temperature of the curing zone at a plurality of sites in the curing zone with temperature sensing means and generating temperature signals therewith corresponding to the real time elevated temperature at each of the sites in the curing zone, and transmitting the temperature signals from the temperature sensing means to computer-monitor means adaptable for displaying the real time temperature of each of the sites in the curing zone as temperature functions over a predetermined period of time. In still further embodiment, the computer-monitor means for displaying the temperature functions is also operable for automatically calculating an average temperature corresponding to the average of the real time temperatures at each of the sites; and for displaying the average temperature.

In one embodiment, the computer-monitor means for displaying the container weight function is also operable for inputing a predetermined low weight parameter and for activating an alarm signal when the paint weight signal reaches the predetermined low weight parameter.

In another embodiment, the system further comprises a data input device proximate the conveyor line for imputing a paint identifier code to the computer-monitor means for displaying the container weight function In still another embodiment, the computer-monitor means for displaying the line speed function is also the computer-monitor means for displaying the container weight function In a further embodiment, the computer-monitor means is also operable for displaying the functions sequentially upon an input command to the computer-monitor means. In a still further embodiment, the computer-monitor means is also operable for storing the functions in a memory. In yet another embodiment, the system further comprises printer means electronically linked to the computer-monitor means, and the printer means is operable for printing the functions from the memory.

In one embodiment, the computer-monitor means for displaying the container weight function is also operable for automatically subtracting a delivery container tare weight from the real time weight of the delivery container and powder paint particles therein thereby calculating a second container weight function, and for displaying the second container weight function over a predetermined period of time.

In another embodiment, the computer-monitor means for displaying the container weight function is also the computer-monitor means for displaying the line speed function, the computer-monitor means for displaying the pH function, and the computer-monitor means for displaying the temperature functions.

The manager may use the various functions and other information resulting from and produced by the monitoring system to evaluate the performance of personnel and to discuss with the personnel how performance may be improved. The monitoring system also alerts the manager if the curing zone is not at the proper temperature so that corrective action may be initiated.

The records produced by this invention can also be used in soliciting painting jobs from new customers as evidence of the company's ability to provide good quality control. For example, the viewing of the monitoring system's pH function and printed records thereof enables the manager to provide visual proof to existing and potential customers of the company's proper article precleaning and surface activation operation. Likewise, the viewing of the monitoring system's temperature function and printed records thereof enables the manager to provide visual proof to existing and potential customers of the company's proper curing operation.

The monitoring system records also allows the manager to review the historical data of a particular job at a later date if a problem is later discovered, such as insufficient bonding of the powder to the articles.

The monitoring system also enables excellent control of powder inventory, and facilitates "just in time" supply purchases and estimating of powder quantities required for various articles

DESCRIPTION OF THE PREFERRED EMBODIMENTS

Figure 1:
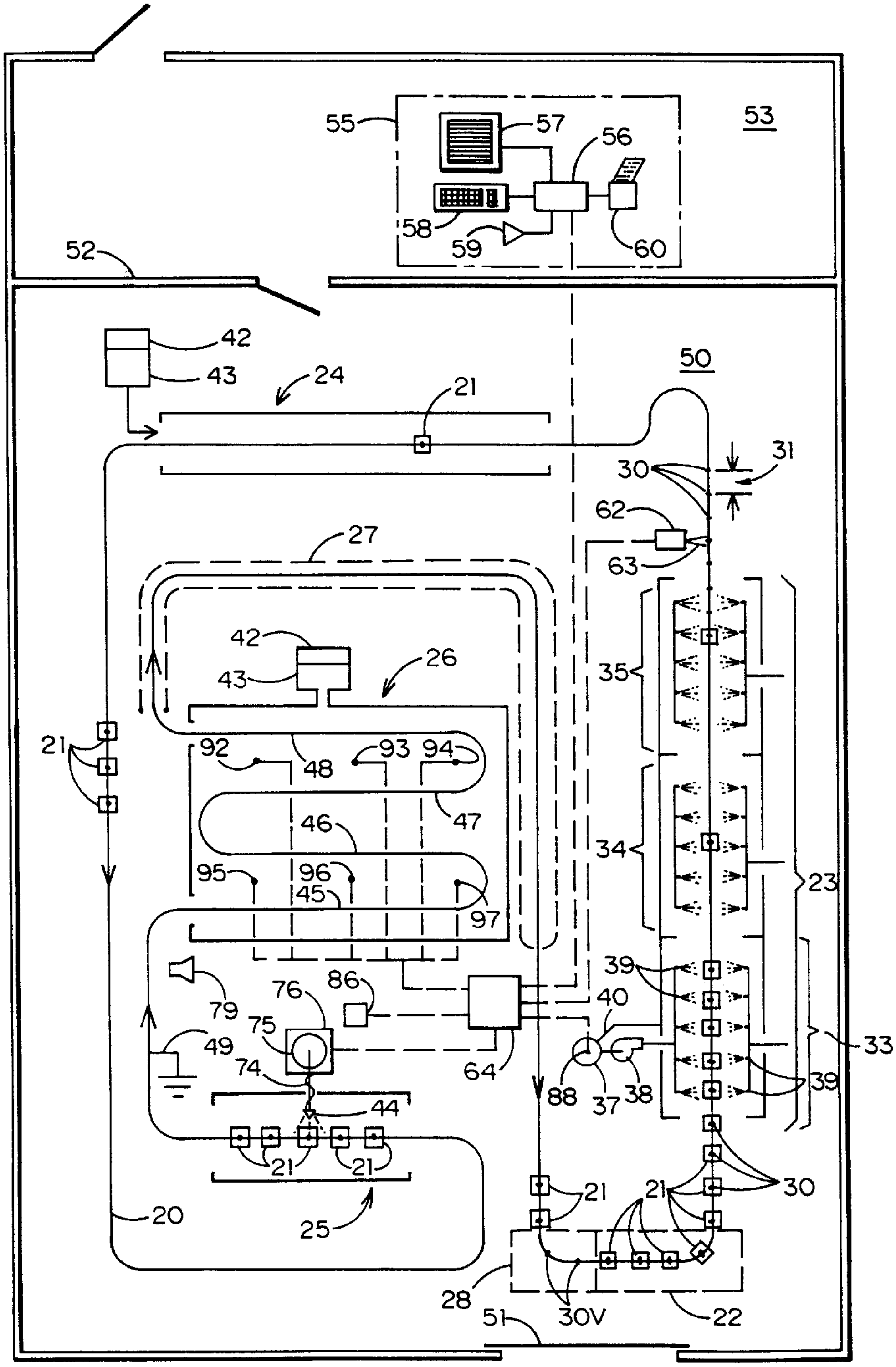
FIG. 1 is a schematic of a monitoring system of this invention added to a flow diagram of a conventional electrostatic powder painting process.

Referring to FIG. 1, a flow diagram for a conventional electrostatic powder painting process is illustrated. The process involves a number of zones through which a conveyor line 20 travels with articles 21 to be painted carried by the line 20, usually by hanging therefrom. The conveyor line 20 travels continuously and sequentially through line loading zone 22, pretreatment zone 23, drying zone 24, powder application zone 25, curing zone 26, cool down zone 27, and line unloading zone 28.

The articles are loaded on conveyor line 20 in line loading zone 22. In electrostatic powder painting processes, conveyor line 20 is equipped with a plurality of spaced hooks or other article carrier means 30, usually referred to as "carts", which are uniformly spaced apart a predetermined distance 31, usually about 1 ft. The articles 21 to be painted are merely hung from the carts. For small articles, an article is hung from each cart, while for larger articles an article is hung from every other cart or every third cart.

Since the unpainted articles generally are received coated with a thin film of protective oil, the oil must be thoroughly removed before the articles can be painted to enable bonding of the powder paint particles to the articles. In the electrostatic powder painting process of FIG. 1, pretreatment zone 23 consists of three stages, namely a combined cleaning-surface activation stage 33, an initial rinse stage 34, and a final rinse stage 35. In the combined cleaning-surface activation stage 33 an aqueous solution of a cleaning agent and a surface activation agent, sometimes referred to herein as "cleaning-activation agent", is pumped from tank 37 by pump 38 through a plurality of nozzles 39 and sprayed on articles 21 as they are conveyed through the stage. As the solution drains from the articles the solution is collected and fed by gravity through line 40 back into tank 37 where it is recycled back to combined cleaning-surface activation stage 33. Periodically the recycled solution must be strengthen by adding fresh cleaning agent-activation agent to tank 37.

In another electrostatic powder painting process, not shown in the figures, the pretreatment zone comprises five sequential stages, namely a cleaning or deoiling stage, a rinse stage, a surface activation stage, a second rinse stage, and a final rinse stage with de-ionized water. Where articles are more difficult to clean and to surface activate, more stages may be used including as many as nine stages. However, the monitoring system of this invention can be used with any pretreatment zone regardless of the number of stages.

Examples of cleaning agents are ARP-286. The surface activation agent is effective for conditioning the surface of the articles so that the powder paint particles will adhere to and bond to the surface of the articles. Examples of surface activation agents are iron phosphate or zinc phosphate used for all metals. Other phosphates are also sometimes used. Examples of cleaning-activation agents are Americoat 1077 purchased from American Research Products, Inc.

After leaving the pretreatment zone 23 the articles are dried in a drying zone 24 with hot air blown by fan 42 through heater 43 into drying zone 24. The temperature of the hot air is generally between 200° and 400° F., and usually about 300° F. Drying of the articles is a function of time and temperature, with higher drying temperatures requiring less time to dry. Because of their shape, some articles drain more slowly than others and therefore are more difficult to dry. Larger articles usually are more difficult to dry than smaller articles.

After leaving the drying zone 24, the articles are conveyed into the powder application zone 25 where the powder is electrostatically sprayed from spray gun 44 onto the articles as they are conveyed through the zone. Spray guns for applying the powder are equipped with a corona wires which charges the particles so that they are attracted to the metal articles carried by the conveyor line. It is recognized in the industry that the conveyor line should be well grounded for good powder-to-article attraction as shown by ground 49. Powder which overshoot the articles is preferably collected in the bottom of powder application zone 25 and recycled.

After leaving the powder application zone 25, the articles are conveyed into curing zone 26 which is maintained at an elevated temperature effective for bonding the powder to the articles. The temperature for the curing zone is generally between 375° and 400° F., with hot air blown by fan 42 through heater 43 into curing zone 26. and preferably between 350° and 400° F. The degree of curing or bonding of the powder to the articles is usually a function of time and temperature. The higher the curing temperature the shorter the time required to cure, and the lower the curing temperature the longer the time to cure. For example, at 300° F. the cure time required for a particular articles might be about 10 minutes, while at 400° F. the cure time required may only be about 8 minutes. In the electrostatic powder painting process illustrated in FIG. 1, conveyor line 20 makes four passes 45, 46, 47 and 48 from one end of curing zone 26 to its other end before exiting the curing zone.

After leaving the curing zone the articles are carried by conveyor line 20 through a cool down zone 27 and finally to a line unloading zone 28 where they are removed from the conveyor line thereby leaving vacant carts 30V. The vacant carts are then loaded with more articles and the electrostatic powder painting process continued.

Conveyor line 20 and the aforementioned processing zones are located within large powder operation room 50 equipped with sliding door 51 through which unpainted articles are received and painted articles are loaded on trucks for delivery to customers or OEM's.

This invention provides a monitoring system for monitoring the electrostatic powder painting process illustrated in FIG. 1, and processes similar thereto, so that the manager does not have to be physically present at all times at the conveyor line in order to be aware of the operations.

One important aspect of the manager position is to keep the electrostatic powder painting process up and running so that valuable production time is not lost by conveyor line stoppages due to the manager's unawareness of operational details. Many situations that frequently cause the line to shut down unnecessarily, could be avoided if the manager had a convenient system for monitoring the line. Therefore keeping the line running when it should be running, is a very important concern of a manager and is an objective of this invention.

Adjacent to room 50 but separated therefrom by wall 52 is manager's office 53. Wall 52 insulates office 53 from heat and sound generated in room 50. Office 53 contains computer unit 55 which comprises console 56, monitor 57, key board 58, mouse 59 and printer 60 which are central to the monitoring system of this invention which is more fully described below and illustrated in FIGS. 2–10. Computer unit 55, however, need not be located in an office immediately adjacent to powder operation room 50 but can be in a building physically separated from room 50. In a further embodiment, of this invention the transmission signals mentioned hereinafter can be transmitted telephonically so that the manager can oversee two or more electrostatic powder painting processes located at different sites. In another embodiment, the management personnel can have a computer terminal linked to the monitoring system at their home so that such personnel can review operations from their homes and if necessary consult with the foreman at the line.

To enable the manager to conveniently monitor conveyor line speed, a motion detector 62 is provided at some convenient point along the line, which in FIG. 1 is at a location between pretreatment zone 23 and drying zone 24. The motion detector, however, could be located at any point desired along the conveyor line. Motion detector 62 detects each time a cart 30, or alternatively an article 21, on the conveyor line 20 passes through the motion detector's line of sight 63. When the line of sight is broken, for example by a passing cart, motion detector 62 generates a line speed signal which is transmitted to console 56, preferably through junction box 64. The motion detector is one example of speed sensing means.

Figure 2:
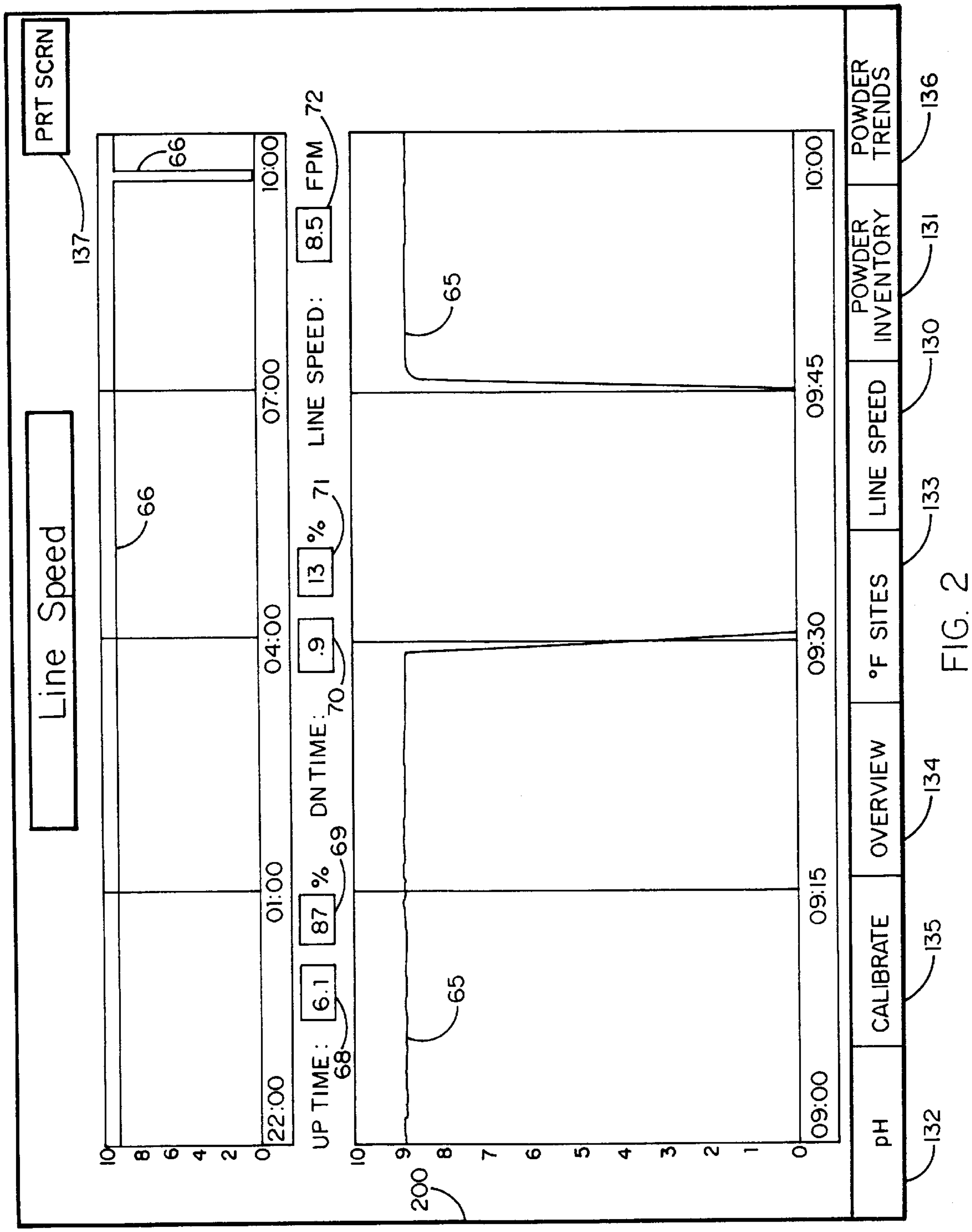
FIG. 2 is a line speed function computer screen display generated by the monitoring system showing both a short term line speed function and a long term line speed function.

Console 56 convert the line speed signal into a line speed function which can be displayed on monitor 57 in real time by suitable input command to computer unit 55. An example of such line speed function display is shown in FIG. 2, generally designated by screen numeral 200 and entitled "Line Speed", wherein the line speed function includes a short term line speed function 65 and a long term line speed function 66. The line speed functions preferably have the line speed in FPM (feet per minute) along the ordinate or y-axis and the real time along the abscissa or x-axis. For both line speed functions 65 and 66, the ordinate ranges from 0 to 10 FPM. All input commands to computer unit 55 mentioned herein can be entered by key board 58 and preferably also by pointing at various icons and clicking mouse 59.

In FIGS. 2 to 6, short term functions 65, 77S, 78S, 89, 92S, 93S, 94S, 95S, 96S and 97S span about 1 hour, which in the examples is from about 09:00 to about 10:00. Long term functions 66, 77L, 78L, 90, 92L, 93L, 94L, 95L, 96L and 97L span about 12 hours, which in the examples is from about 22:00 the previous day to about 10:00 of the current day. In FIGS. 2 to 6, real time is expressed on a 00:00 to 23:59 hour:minute scale.

As seen in line speed functions 65 and 66 of example of FIG. 2, the conveyor line had been running at about 9 FPM until about 09:30 of the current day at which time the line was stopped. If stopping the line was unexpected, the manager can immediately interrupt his present activities, investigate and take steps to minimize the down time.

Other information and data valuable to the manager can also be simultaneously displayed with the line speed functions as alpha-numeric insets. Referring to FIG. 2, examples of such insets are:

Up Time, expressed in hrs., box 68,

Up Time, expressed in % of total elapsed time since the start of the run, box 69, Down Time, expressed in hrs., box 70, Down Time, expressed in % of total elapsed time since the start of the run, box 71, and Line Speed, expressed in FPM, box 72.

A frequent cause of unnecessary conveyor line shut down is down-time spent for refiling delivery container 75 with powder. Spray gun 44 receives powder from delivery container 75 through hose 74. Usually, in all modern electrostatic powder painting processes, the delivery container can be refiled with powder without stopping spray painting or the conveyor line.

In the embodiment shown in FIG. 1, delivery container 75 containing the powder is positioned on a weight scale 76 which generates a container weight signal corresponding to the combined weight of the delivery container and powder therein. A weight scale is one example of scale means. The container weight signal is then transmitted from the scale, preferably through junction box 64, to console 56.

Figure 3:
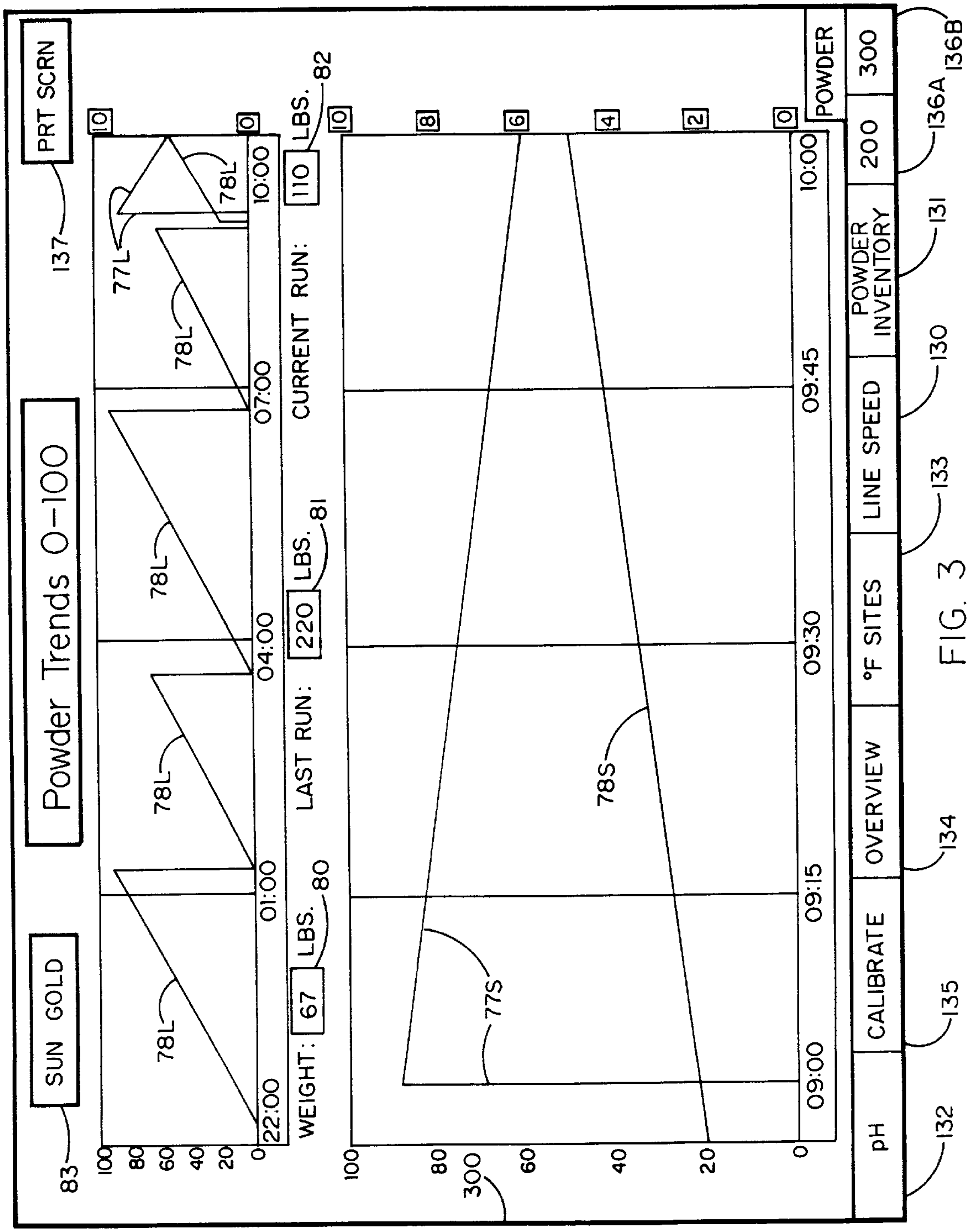
FIG. 3 is a container weight function and powder used function computer screen display showing examples of a short term container weight function and a long term container weight function, and examples of a short term powder used function and a long term powder used function.

Computer unit 55 can display the real time combined weight of the delivery container and powder as a container weight function on monitor 57 upon an input command to computer unit. An example of such line container weight function display is shown in FIG. 3, generally designated by screen numeral 300 and entitled "Powder Trends 0–100", wherein the container weight function includes a short term container weight function 77S and a long term container weight function 77L. These container weight functions preferably have the weight along the ordinate or y-axis and the real time along the abscissa or x-axis. If desired, the container weight function can be displayed as the net weight of the powder with the tare weight of the delivery container automatically subtracted from the combined weight by the computer unit.

In FIG. 3, short and long term container weight functions 77S and 77L are shown spanning the same period of time as that shown in FIG. 2 for short and long line speed functions, 65 and 66, respectively. For both container weight functions 77S and 77L, the ordinate ranges from 0 to 100 lbs. in FIG. 3.

As illustrated by container weight functions 77S and 77L, the combined weight of the delivery container and powder therein decreased at about a constant downward slope with time, indicating a steady rate of powder consumption, until various times when the delivery container was recharged with more powder.

If the manager notices that the container weight function is getting very low, he can interrupt his present activities and remind the operators to recharge the delivery container thereby avoiding stopping the line to refill the delivery container with more powder. An alarm 79 is also provided in operations room 50 to sound when the powder level in delivery container 75 is low. To simplify the long term graph, only the last hour of container weight function 77L is shown.

Computer unit 55 can also display the real time total weight of powder used for a particular job as powder used functions. Examples of such line powder used functions are shown in FIG. 3, wherein the function includes short term powder used function 78S, and long term powder used function 78L. Powder used functions 78S and 78L are superimposed on container weight functions 77S and 77L and are retrieved simultaneously with those functions with screen 300. As illustrated in FIG. 3, the total powder weight used increased at about a constant upward slope with time, indicating a steady rate of powder consumption, until various times when the powder used function was rezeroed to prevent it from running off the graph.

Other information and data valuable to the manager can also be displayed with the container weight functions as alpha-numeric insets. Referring to FIG. 3, examples of such insets are:

The current combined delivery container and powder weight therein, in lbs., box 80, The total powder weight used in the last run, in lbs., box 81, The total powder weight used in the current run, in lbs., box 82, and Powder Identifier, box 83.

A key pad 86, preferably located near the delivery container 75, is used by operating personnel to enter a Powder Identifier code. The key pad transmits a corresponding powder identifier signal, preferably through junction box 64, to console 56. Computer unit 55 also displays the Powder Identifier on monitor simultaneously with the container weight and powder used functions as box 83 in FIG. 3. This information is important to the manager in order to catch as soon as possible a mistake in the paint being sprayed. It is very costly to discover after a job has been completed that the wrong paint was used.

Master icon 136 is replaced with icons 136A and 136B in FIG. 3. Icon 136A is used for changing the ordinate scale from 0–100 lbs. to 0–200 lbs. and icon 136B for changing the ordinate scale from 0–100 lbs. to 0–300 lbs. upon a point and click command from mouse 59.

Maintaining the proper concentration of the cleaning-surface activation agent in the combined cleaning-surface activation stage 33 is critical to the bonding of the powder to the articles. If the concentration of the cleaning-activation agent is too low the oil film will not be removed and the surface of the articles will not be adequately activated for bonding of the powder to the articles. In the past it has been the practice to add a predetermined amount of cleaning-activation agent to tank 37 about every three hours to maintain an effective concentration of the cleaning-activation agent.

The pH of the cleaning-activation agent in tank 37 is a function of the concentration of cleaning-activation agent. When using ARP-286 and Americoat 1077 as the cleaning-activation agent, its concentration should be maintained in the range of from about 2 to about 5%, which corresponds to a pH range of from about 2 to about 4.8. In this invention, a pH sensor 88 is installed in tank 37 to sense the pH of the cleaning-activation agent solution therein. The pH sensor transmits a pH signal to console 56, preferably through junction box 64. A pH sensor is an example of pH measuring means.

Figure 4:
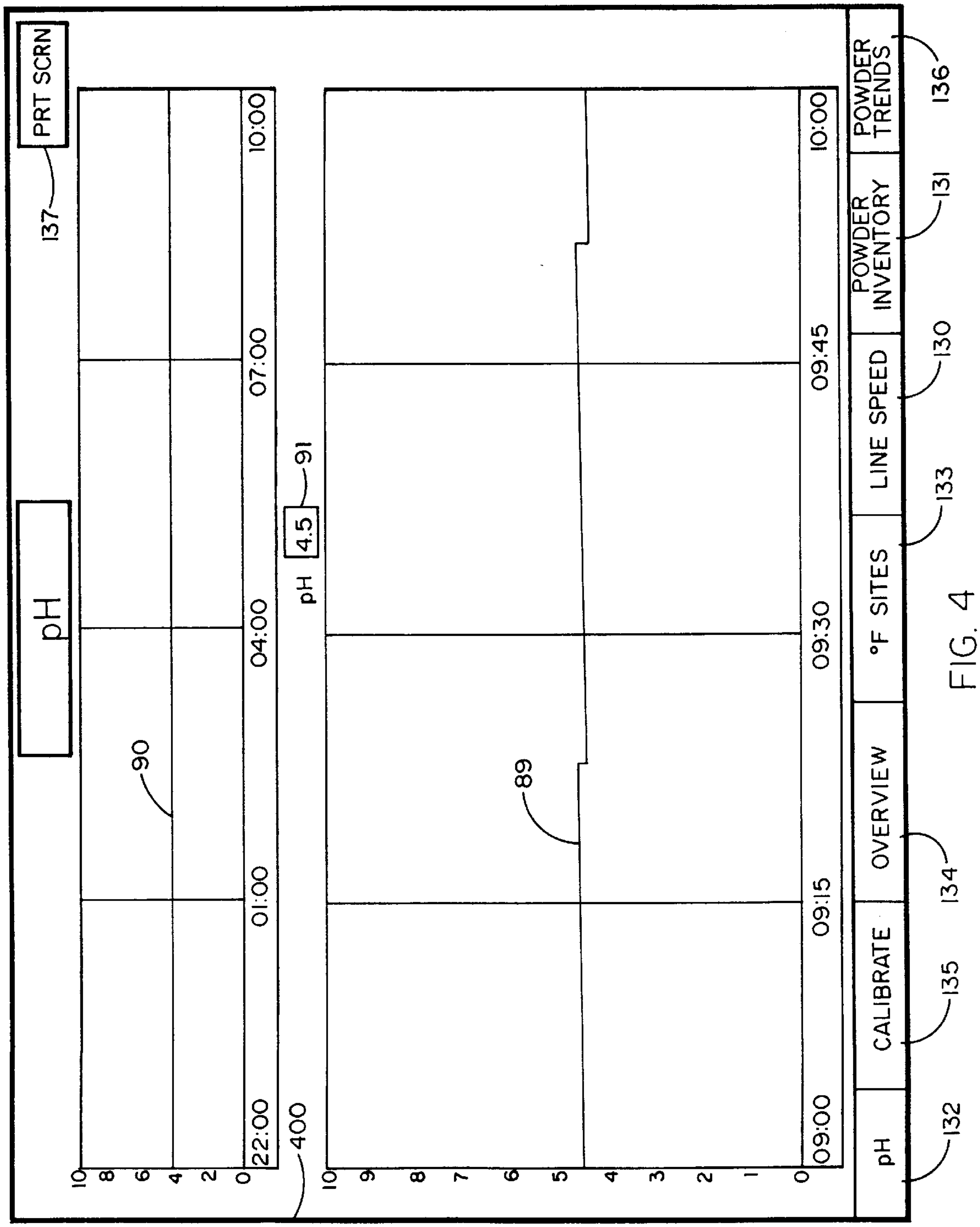
FIG. 4 is a pH function computer screen display showing an example of a short term pH function and a long term pH function of the cleaning-activation agent solution used in the pretreatment zone of FIG. 1.

Console 56 convert the pH signal into a pH function which can be displayed on monitor 57 in real time by suitable input command to computer unit 55. An example of such pH function display is shown in FIG. 4, generally designated by screen numeral 400 and entitled "pH", wherein the pH function includes a short term pH function 89 and a long term pH function 90. The pH functions preferably have the pH value along the ordinate or y-axis and the real time along the abscissa or x-axis. The current pH value is shown in box 91.

In FIG. 4, short term pH function 89 and long term pH function 90 span the same period of time as that shown in FIG. 2 for short and long line speed functions, 65 and 66, respectively. For both pH functions 89 and 90, the ordinate ranges from 0 to 14 pH values. However, because of the condensed ordinate scale with long term pH function 90, the curve appears as a straight line since the variation in pH when using ARP-286 and Americoat 1077 as the cleaning-activation agent, runs normally between 4.3. and 4.5.

Insuring that the curing zone is maintained at the proper temperature is also provided for in the monitoring system of this invention by installing thermocouples to sense the temperature at several sites in the curing zone. With reference to FIG. 1, six thermocouples, 92, 93, 94, 95, 96 and 97 are shown in curing zone 26. Each thermocouple generates a temperature signal which is transmitted to console 56, preferably through junction box 64. A thermocouple is an example of temperature sensing means.

Figure 5:
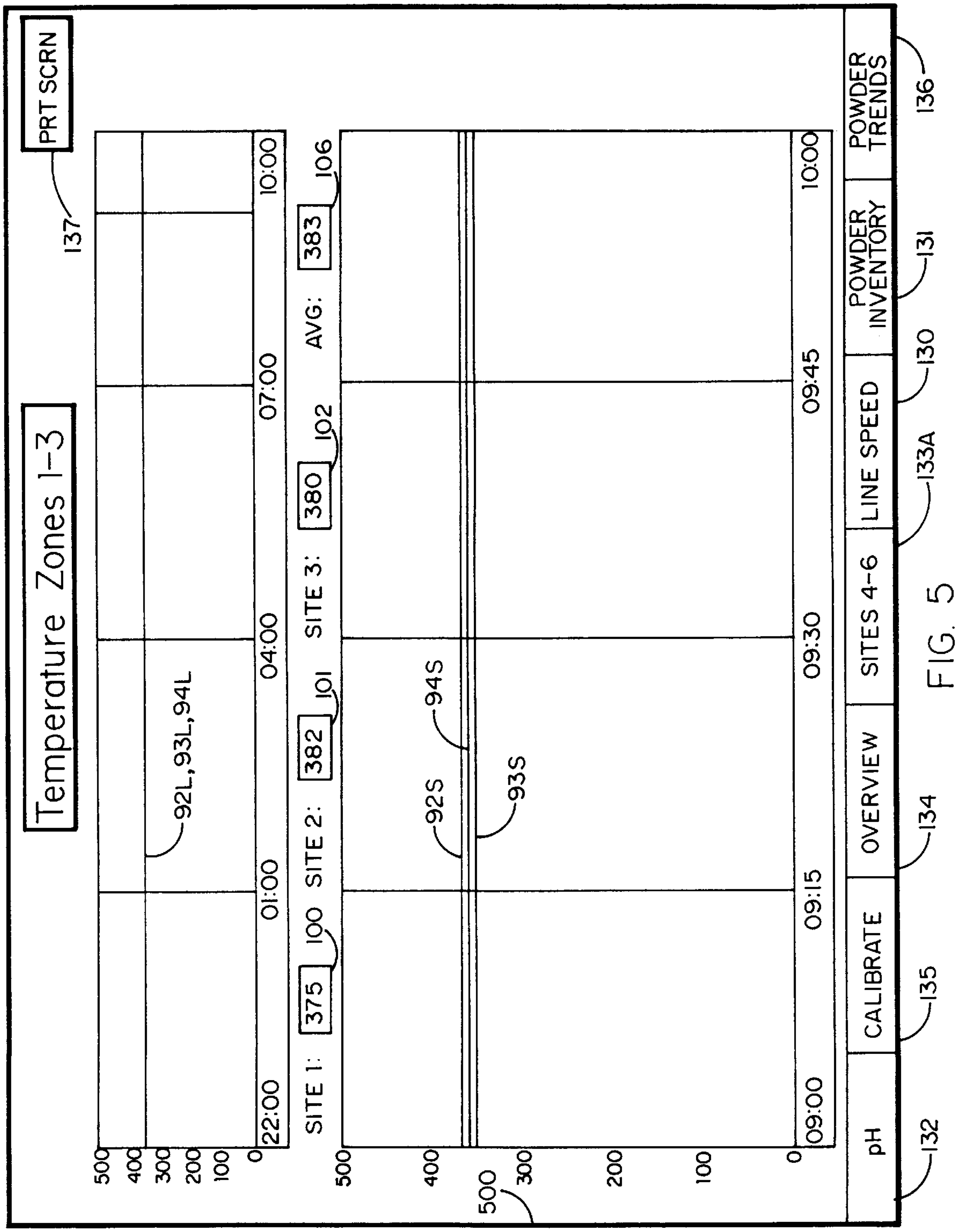
FIG. 5 is a temperature function computer screen display showing an example of a short term temperature functions and long term temperature functions at three sites in the curing zone of the process of FIG. 1.

Console 56 convert the temperature signals into temperature functions which can be displayed on monitor 57 in real time by suitable input command to computer unit 55. An example of such temperature function display is shown in FIG. 5, generally designated by screen numeral 500 and entitled "Temperature Zones 1–3", for thermocouples 92, 93 and 94, and FIG. 6, generally designated by screen numeral 600 and entitled "Temperature Zones 4–6", for thermocouples 95, 96 and 97. The temperature functions includes a short term temperature function and a long term temperature function for each thermocouple site. Short term temperature functions 92S, 93S, 94S, 953, 96S and 97S receive their input from thermocouples 92, 93, 94, 95, 96 and 97, respectively. Long term temperature functions 92L, 93L, 94L, 95L, 96L and 97L also receive their input from thermocouples 92, 93, 94, 95, 96 and 97, respectively. The scale for the temperature functions preferably have temperature in °F. along the ordinate or y-axis, and real time along the abscissa or x-axis. For all temperature functions in FIGS. 5 and 6, the ordinate ranges from about 0° F. to about 500° F.

Figure 6:
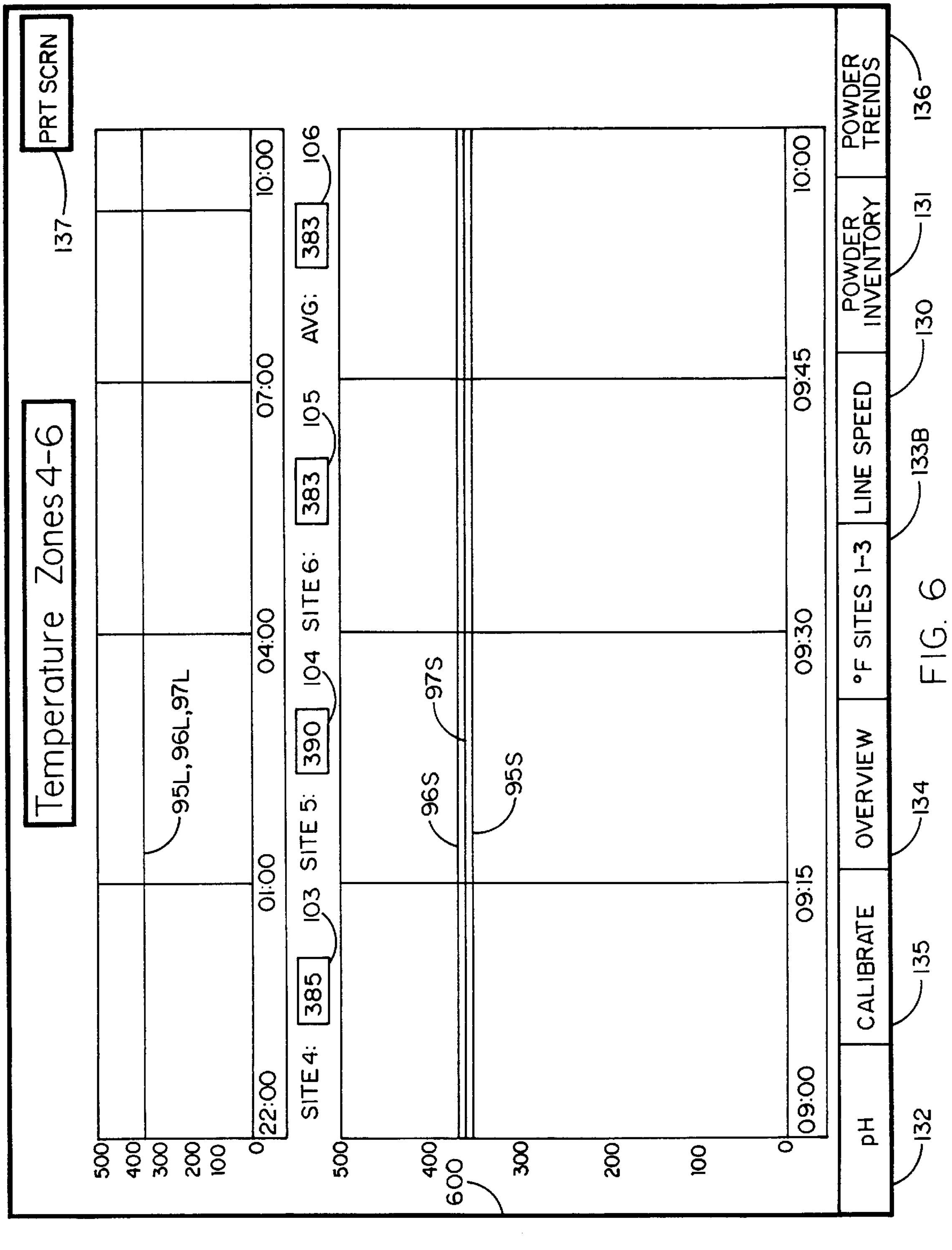
FIG. 6 is another temperature functions computer screen display, similar to FIG. 5, except at three additional sites in the curing zone.

Other information and data valuable to the manager can also be simultaneously displayed with the temperature functions as alpha-numeric insets. Referring to FIGS. 5 and 6, examples of such insets are:

Site 1, temperature expressed in °F., box 100,

Site 2, temperature expressed in °F., box 101,

Site 3, temperature expressed in °F., box 102,

Site 4, temperature expressed in °F., box 103,

Site 5, temperature expressed in °F., box 104, and

Site 6, temperature expressed in °F., box 105.

The average temperature of the six sites expressed, in °F., box 106.

In FIG. 5, master icon 133 is replaced with icon 133A for accessing FIG. 6. Similarly in FIG. 6, master icon 133 is replaced with icon 133B for accessing FIG. 5.

If desired, this monitoring system can also provide a display similar to FIG. 5 for monitoring the temperature of drying zone 24.

Figure 7:
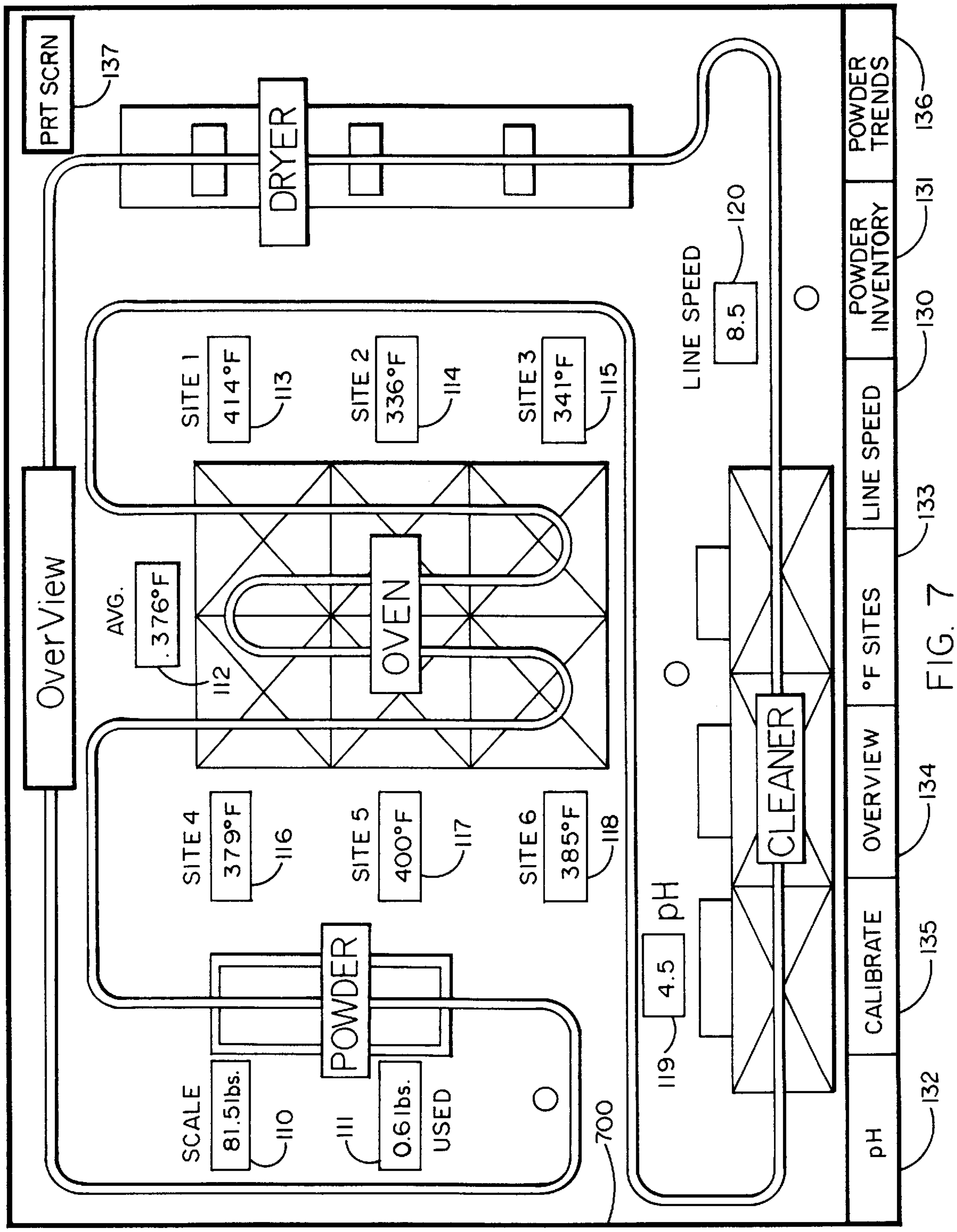
FIG. 7 is a computer screen display showing for an overview of the powder painting process of FIG. 1 with some important parameters displayed.

A most informative display generated by the monitoring system of this invention is that of an overview of the entire powder painting process an example of which is shown in FIG. 7, generally designated by screen numeral 700 and entitled "Overview". Critical conditions occurring in the electrostatic powder painting process are displayed as alpha-numeric insets positioned adjacent a simulated conveyor line in process diagram showing the various zones. The insets in FIG. 7 are as follows:

The current combined delivery container and powder therein weight in lbs., box 110, The total powder used in the current run, in lbs., box 111, The average temperature of the six sites where thermocouples 92, 93, 94, 95, 96 and 97 are located, expressed in °F., box 112, Site 1 temperature, where thermocouple 92 is located, expressed in °F., box 113, Site 2 temperature, where thermocouple 93 is located, expressed in °F., box 114, Site 3 temperature, where thermocouple 94 is located, expressed in °F., box 115, Site 4 temperature, where thermocouple 95 is located, expressed in °F., box 116, Site 5 temperature, where thermocouple 96 is located, expressed in °F., box 117, Site 6 temperature, where thermocouple 97 is located, expressed in °F., box 118, The pH of the cleaning-activation agent solution in tank 37, box 119, and Line Speed expressed in FPM, box 120.

The manager while in office 53 may leave either the overview display, illustrated by FIG. 7, or the line speed function display, illustrated by FIG. 2, on monitor 57 when not viewing one of the other displays, so that with a glance from his desk he can immediate ascertain if there is any difficulty in the electrostatic powder painting process.

The computer unit enables each display to be retrieved quickly, through key board command, or by pointing and clicking to Master Icons displayed on monitor 57. Examples of such Master Icons and their labels are:

| Master Icon | Element No. | Retrieves Display Similar To |
|---|---|---|
| Line Speed | 130 | FIG. 2 |
| Powder Trends | 136 | FIG. 3 |
| pH | 132 | FIG. 4 |
| °F. Sites | 133 | FIG. 5 |
| Overview | 134 | FIG. 7 |
| Calibrate | 135 | FIG. 8 |
| Powder Inventory | 131 | FIG. 9 |
| Prt Scrn | 137 | Prints the current screen |

Positioning the mouse arrow on the Print Screen icon 137 and clicking mouse 59 causes computer unit 55 to instruct printer 60 to print the screen currently displayed on monitor 57.

The monitoring system of this invention can also be used to display and input, other values and names to the computer unit 55. For example, the screen shown in FIG. 8, generally designated by screen numeral 800 and entitled "Calibration", refers to the following Instructions and Set Points:

| Instruction | Set Point, or Icon |
|---|---|
| Enter new Line Speed if different from actual speed. | Line speed FPM; Set Point 141 |
| To calibrate use Set TARE to zero the scale, then using a known | Set TARE; Icon 142 |
| weight enter new Powder Scale Weight if different from known weight. | Scale Weight in lbs; Set Point 143 |

Enable Up Time and Down Time during these hours:

| | |
|---|---|
| Daily Start Time. | Set Point 144 |
| Daiiy Stop Time. | Set Point 145 |
| Low Powder Alarm LBS. | Set Point 146 |
| Inventory Discrepancy %. | Set Point 147 |

Figure 8:
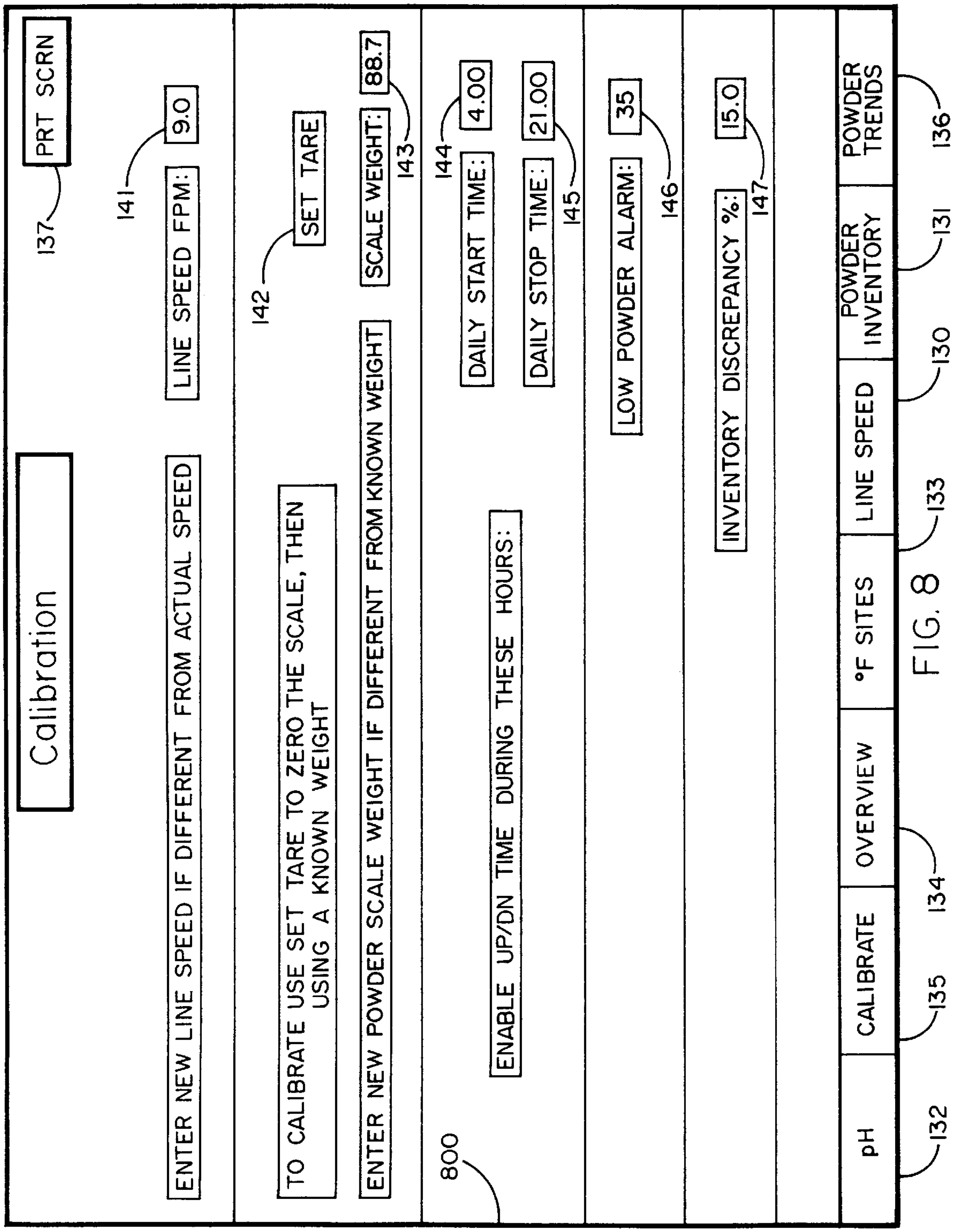
FIG. 8 is a computer screen display, referred to briefly as the "Calibration Screen" for the monitoring system.

Calibration Screen 800 shown in FIG. 8 is used by management to set the parameters for the monitoring system. The parameters may vary from company to company. Once the parameters are set they serve as a basis for interpreting the information generated by the monitoring system.

Set Point 141 is used to set the line speed, which is usually set when the monitoring system is installed and usually does not need to be set.

Icon 142 is used for adjusting the weight reading of scale 76 with a known weight on the scale, to the weight of the known weight, by entering the known weight in box 143, thereby insuring that future scale weights reported by the monitoring system are accurate. Set Point 143 is reset frequently as the powder hopper or delivery container 75 is changed.

Set Point 144 and Set Point 145 are used to set the up and down times. The up and down times, or operating hours, are adjusted as needed to correspond to the nominal production hours. For example, for two shifts the up and down times might be set for 00:00 (midnight) the start of the first shift and 16:00 the end of the second shift. The actual operating hours may vary from company to company.

Set Point 146 is used to set the alarm for a predetermined low level of powder in delivery container 75. The set point for this alarm is up to the discretion of the manager to decide at what weight the alarm should sound.

Set Point 147 is used to set the maximum percentage variance in powder inventory between the value generated by the monitoring system and the value entered periodically by the operator or management. If the amount enter by management exceeds the set point % discrepancy, box 147, then the monitoring system will generate a prompt signal which pops up the Reorder Inventory screen of FIG. 10. The prompt signal may be removed from FIG. 10 upon recognition by management which should occur only after the particular powder ID is re-inventoried and the discrepancy resolved. The Inventory Discrepancy %, box 147, may vary from company to company.

Set Points 141, 142, 143, 144, 145, 146 and 147 are the values entered and changed by management as required for monitoring the electrostatic powder painting process.

Preferably, access to FIG. 8 requires a password, since prevention of unaccounted loss of powder is one of the embodiments of the monitoring system.

Figure 9:
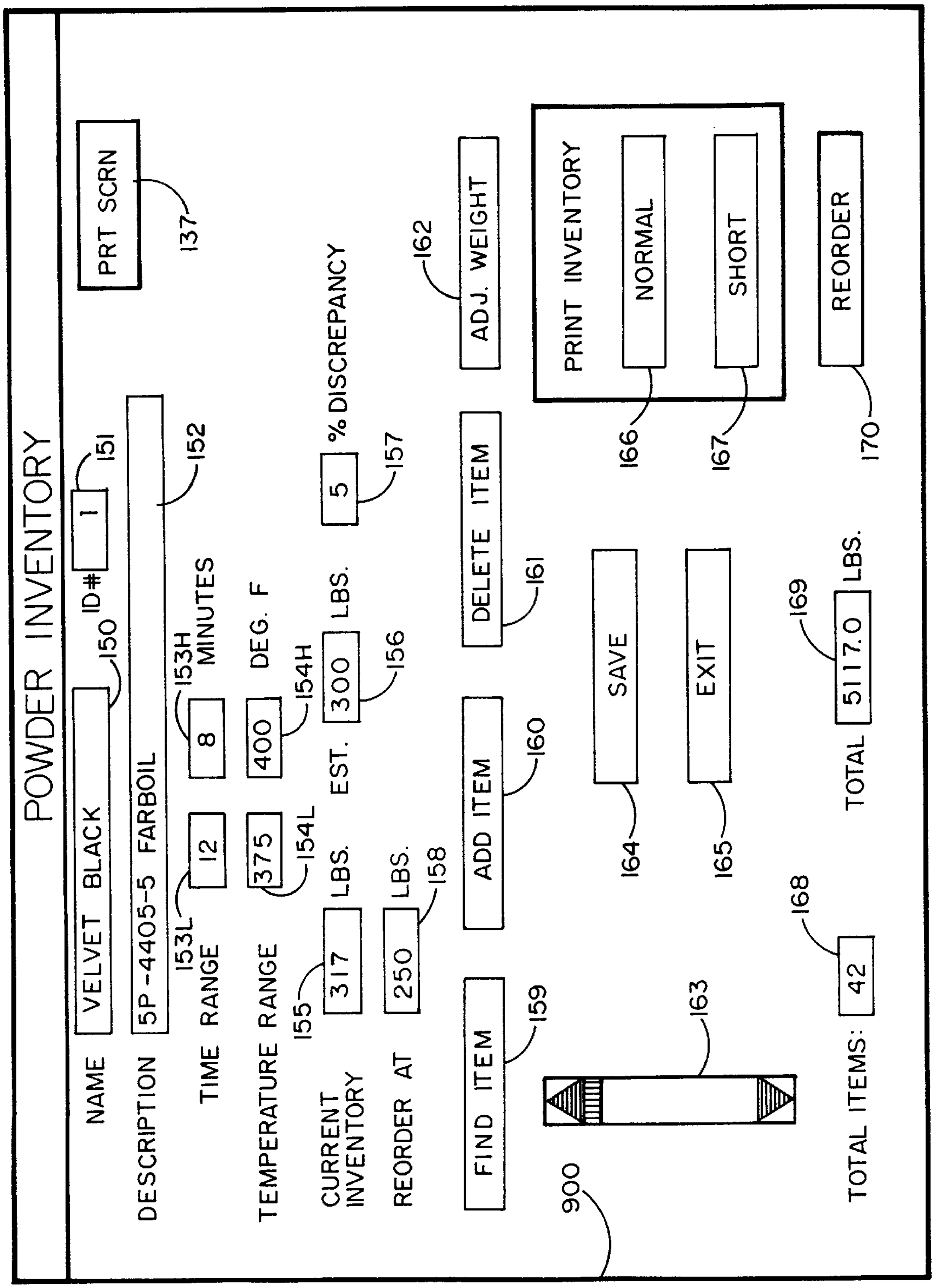
FIG. 9 is a computer screen display, referred to briefly as the "Powder Inventory Screen" for the monitoring system.

The screen display 900, shown in FIG. 9, referred to as "Powder Inventory", is produced by the monitoring system for each powder inventoried. The following Identifiers, Set Points, Current Values and Icons are displayed in FIG. 9:

| Instruction | Identifier, or Set Point, or Current Value or Icon |
|---|---|
| Name | Identifier 150 |
| ID# | Identifier 151 |
| Description | Identifier 152 |
| Time Range, in minutes | Set Point 153L and Set Point 153H |
| Temperature Range, in °F. | Set Point 154L and Set Point 154H |
| Current Inventory | Current Value 155 |
| Est. | Set Point 156 |
| % Discrepancy | Current Vaiue 157 |
| Reorder at lbs. | Set Point 158 |
| Find Item | Icon 159 |
| Add Item | Icon 160 |
| Delete Item | Icon 161 |
| Adj. Weight | Icon 162 |
| Image of a Scroll Bar | Icon 163 |
| Save | Icon 164 |
| Exit | Icon 165 |
| Print Inventory, Normal | Icon 166 |
| Print Inventory, Short | Icon 167 |

-continued

Figure 10:
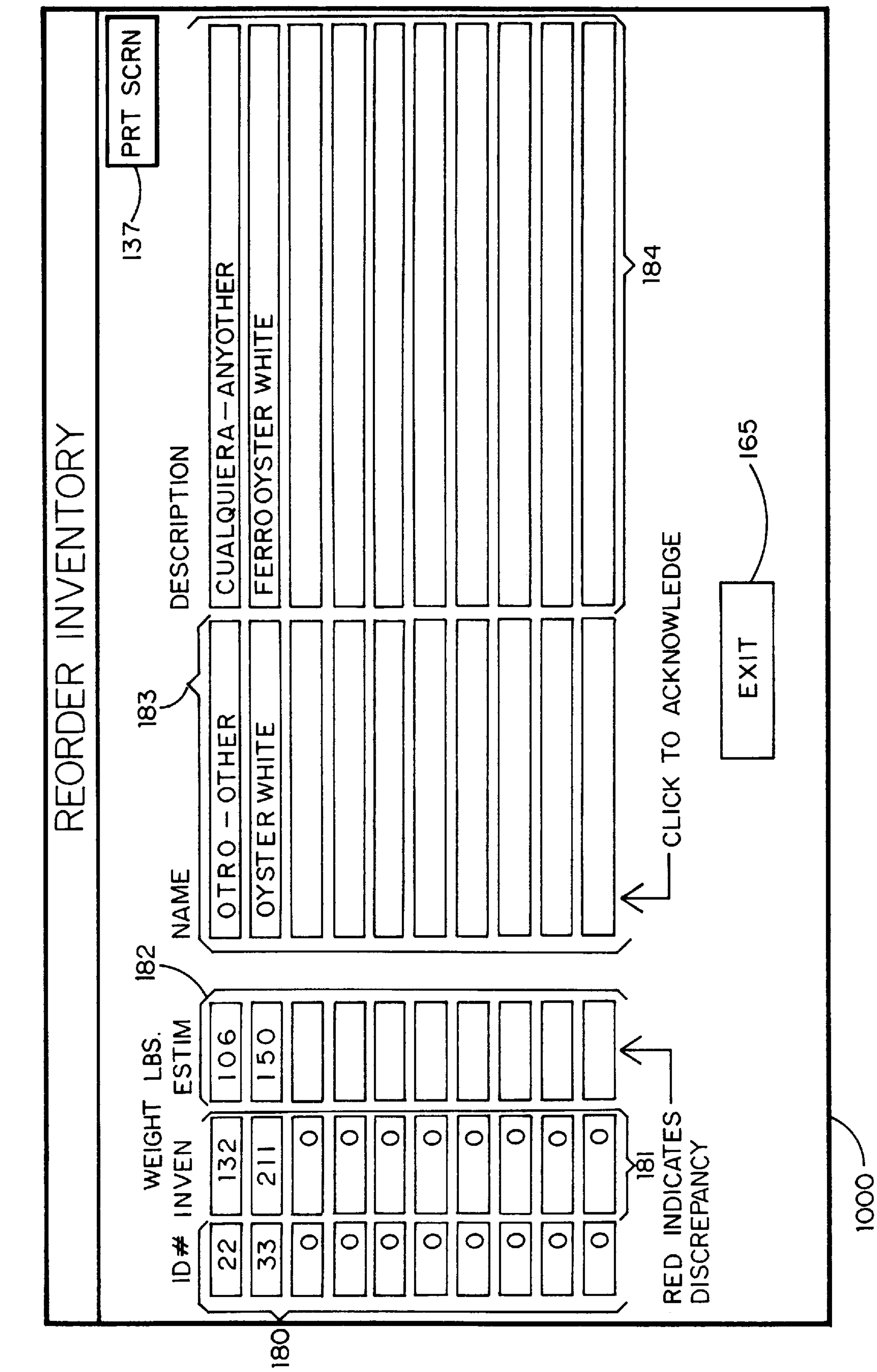
FIG. 10 is a computer screen display, referred to briefly as the "Reorder Inventory Screen" for the monitoring system.

| Instruction | Identifier, or Set Point, or Current Value or Icon |
|---|---|
| Total Items | Current Value 168 |
| Total in Lbs. | Current Value 169 |
| Reorder | Icon 170 - for accessing FIG. 10 |
| Prt Scrn | Icon 137 |

Element 150, 151 and 152 are identifiers for the powder in question, which by pointing to any one of the three and typing in the number or name of the powder, or scrolling to such with up/down scroll bar icon 163, produces a screen of information on the particular powder.

Elements 153L and 153H are set points for low and high line speeds which control the time the articles spend in curing zone 26. Elements 154L and 154H are set points for low and high temperature settings for curing zone 26 for the particular powder in question.

Element 155 is the weight of the current inventory of the powder in question. Element 156 is the physical inventory estimated by the powder technician and inputted to the monitoring system by the powder technician through key pad 86. Element 157, entitled % Discrepancy on screen 900, is the current value of the difference between the current inventory value stored in the memory of monitoring system and the estimated physical inventory value expressed as %. The powder technician deletes powder from the physical inventory, box 156, as he removes it from inventory.

Element 158 is the minimum amount of powder required to be in inventory for a particular powder, which can vary from powder to powder. The monitoring system generates prompt screen 1000 whenever the current inventory reaches the set point value shown in box 158.

Elements 159, 160, 161, 162, 163, 164, 165, 166, 167, 170 and 137 are icons for various computer functions activated by pointing at the particular icon and clicking mouse 59. Element 159 allows the user to find a powder from the list by typing in the name rather than scrolling through the entire list using scroll bar 163. Element 160 is used when entering the name, ID# and description of a new powder. Element 161 deletes an item from the list. Element 162 allows the user to adjust the inventory by adding just received powder to the inventory or making other corrections to the inventory. Element 163 is used for scrolling through the powder inventory list. Element 164 saves the information just entered into the monitoring system Element 165 exits the screen. Elements 166 and 167 prints a short list or normal list, respectively, of the items in inventory.

Element 168 is the total number of powders in inventory.

Element 169 is the current total weight on hand of the particular powder shown in identifiers 150, 151 and 152.

Element 170 accesses Reorder Inventory screen 1000 describe next.

Whenever a particular powder or other inventory item runs low, computer unit 55 will cause a screen, shown in FIG. 10, generally designated by numeral 1000 and entitled “Reorder Inventory”, to pop up after a predetermined period of time, e.g. 20 minutes, on monitor 57. The following Identifiers, Set Points, Current Values and Icons are displayed in FIG. 10:

| Instruction | Identifier, or Set Point, or Current Value or Icon |
|---|---|
| ID# | Identifier column 180 |
| Invent., Weight Lbs. | Current Value column 181 |
| Estim., Weight Lbs., | |
| RED indicates discrepancy | Set Point column 182 |
| Name, Click to Acknowledge | Identifier column 183 |
| Description | Identifier column 184 |
| Exit | Icon 185 |
| Prt Scrn | Icon 137 |

Columns 180, 183 and 184 are the ID#, name and description, respectively, of the powder or powders for which the monitoring system thinks there may be an inventory problem.

Column 181 indicates the current inventory which the monitoring system thinks is on hand. The number(s) appearing in column 181 are calculated by computer unit 55 by subtracting the powder from the inventory as it is removed from delivery container 75. Column 182 shows the physical inventory which the powder technician has estimated and entered into the monitoring system. Only those powders for which a potential problem has been identified appear on screen 1000 of FIG. 10.

Whenever FIG. 10 pops up, it remains on monitor 57 until “acknowledged”, usually performed by pointing and clicking to exit icon 165.

Thus screen 1000 of FIG. 10 is a prompting device which is used to tell management, when a potential problem has been identified by the monitoring system. For example, if the difference between the current inventory that the monitoring system thinks is in stock, shown in column 181, and the physical inventory “set point” that the powder technician believes is on hand and had entered in the monitoring system, shown in column 182, exceeds the set point for % Discrepancy shown in box 147 of FIG. 8, then the monitoring system prompts the viewer by popping up FIG. 10.

When a powder is entered into or added to the inventory, the powder technician enters the data in the monitoring system through box 162 of screen 900 of FIG. 9. FIG. 9 also shows the Set Point, box 158 for ordering more powder. The set point can vary from one powder to another. When the inventory falls to the amount shown in box 158 the powder will be automatically listed on the Reorder Inventory screen 1000 of FIG. 10 and the monitoring system will cause FIG. 10 to pop up after the predetermined period of time, e.g. 20 minutes, thereby alerting management to reorder the particular powder in question to increase inventory of the powder in question above the set point value shown in box 158.

Therefore, the monitoring system will cause screen 1000 of FIG. 10 to pop up (i) whenever the % discrepancy set point shown in box 147 is exceeded, or (ii) whenever the “Current Inventory” shown in box 155 falls to the “Reorder at” value shown in box 158. Whenever the cause of concern (i) occurs, management will have the powder technician redo the physical inventory to see whether it is correct or the current inventory shown in box 155 is correct.

In the example shown in FIG. 10, out of 42 types of powder on hand, box 168, the monitoring system has identified only two powders for which the monitoring system believes there is a potential inventory problem. The 0's in columns 180 and 181 indicate no additional powder problems have been identified by the monitoring system.

In general, computer unit 55 can also save the various functions and displays in the memory of its console, and produce a print out thereof upon an input command to the computer unit and/or automatically at predetermined times.

What is claimed is:

1. A system for monitoring an electrostatic powder painting process having a conveyor line adaptable for transporting articles to be electrostatically powder painted sequentially through a plurality of zones in the process, the system comprising:

a. dispensing powder paint particles from a delivery container through a conduit to an electrostatic powder paint spray gun operable for applying the powder paint particles to the articles in a painting zone;

b. sensing the weight of the delivery container and powder paint particles therein with scale means and generating a paint weight signal therewith corresponding to the real time weight of the delivery container and powder paint particles therein;

c. transmitting the paint weight signal from the scale means to computer-monitor means adaptable for displaying the real time weight of the delivery container and powder paint particles therein as a container weight function over a predetermined period of time;

d. sensing the speed of the conveyor line with speed sensing means and generating a line speed signal therewith corresponding to the real time line speed; and e. transmitting the line speed signal from the speed sensing means to computer-monitor means adaptable for displaying the real time line speed as a line speed function over a predetermined period of time.

2. The system of claim 1, wherein the computer-monitor means for displaying the container weight function is also adaptable for converting the paint weight signal into a powder used function corresponding to the total weight of powder removed from the delivery container and for displaying the real time weight of the powder used as a powder used function over a predetermined period of time.

3. The system of claim 2, wherein the computer-monitor means for displaying the container weight function and for displaying the powder used function displays the powder used function superimposed over the container weight function.

4. The system of claim 1, wherein the predetermined period of time for displaying the container weight function spans at least about 1 hour, and wherein the predetermined period of time for displaying the line speed function spans at least about 1 hour.

5. The system of claim 1, wherein the predetermined period of time for displaying the line speed function is equal to, and corresponds to, the predetermined period of time for displaying the container weight function.

6. The system of claim 1, wherein the container weight function includes a short term container weight function and a long term container weight function, and wherein the line speed function includes a short term line speed function and a long term line speed function.

7. The system of claim 6, wherein the short term container weight function and the short term line speed function each span at least about 1 hour, and wherein the long term container weight function and the long term line speed function each span at least about 8 hours.

8. The system of claim 1, wherein the process also comprises a precleaning-surface activation zone wherein the articles are precleaned and surfaced activated with a recycled cleaning-surface activation solution before painting, and the system further comprising:

sensing the pH of the recycled cleaning-surface activation solution with pH measuring means and generating a pH signal therewith corresponding to the real time pH of the recycled cleaning-surface activation solution; and transmitting the pH signal from the pH measuring means to computer-monitor means adaptable for displaying the real time pH of the recycled cleaning-surface activation solution as a pH function over a predetermined period of time.

9. The system of claim 1, wherein the process also comprises a curing zone wherein the articles after being painted are subjected to an elevated temperature to bond the powder paint particles to the articles, and the system further comprising:

sensing the elevated temperature in the curing zone with temperature sensing means and generating a temperature signal therewith corresponding to the real time elevated temperature in the curing zone; and transmitting the temperature signal from the temperature sensing means to computer-monitor means adaptable for displaying the real time temperature of the curing zone as a temperature function over a predetermined period of time.

10. The system of claim 1, wherein the process also comprises a curing zone wherein the articles after being painted are subjected to an elevated temperature to bond the powder paint particles to the articles, and the system further comprising:

sensing the elevated temperature of the curing zone at a plurality of sites in the curing zone with temperature sensing means and generating temperature signals therewith corresponding to the real time elevated temperature at each of the sites in the curing zone; and transmitting the temperature signals from the temperature sensing means to computer-monitor means adaptable for displaying the real time temperature of each of the sites in the curing zone as temperature functions over a predetermined period of time.

11. The system of claim 10, wherein the computer-monitor means for displaying the temperature functions is also operable for automatically calculating an average temperature corresponding to the average of the real time temperatures at each of the sites; and for displaying the average temperature.

12. The system of claim 1, further comprising a data input device proximate the conveyor line for imputing a paint identifier code to the computer-monitor means for displaying the container weight function.

13. The system of claim 1, wherein the computer-monitor means for displaying the line speed function is also the computer-monitor means for displaying the container weight function.

14. The system of claim 13, wherein the computer-monitor means is also operable for displaying the functions sequentially upon an input command to the computer-monitor means.

15. The system of claim 13, wherein the computer-monitor means is operable for storing the functions in a memory.

16. The system of claim 1, wherein the computer-monitor means for displaying the container weight function is also operable for automatically subtracting a delivery container tare weight from the real time weight of the delivery container and powder paint particles therein thereby calculating a second container weight function, and for displaying the second container weight function over a predetermined period of time.

17. In an electrostatic powder painting process having a conveyor line adaptable for transporting articles to be electrostatically powder painted sequentially through a plurality of zones in the process which zones include a precleaning-surface activation zone wherein the articles are precleaned and surface activated with a recycled cleaning-surface activation solution before painting, a rinse zone where articles leaving the precleaning-surface activation zone are rinsed to remove cleaning-surface activation solution from the articles, a drying zone where articles leaving the rinsing zone are dried, a painting zone wherein the dried articles are painted by dispensing powder paint particles from a delivery container through a conduit to an electrostatic powder paint spray gun operable for applying the powder paint particles to the articles, and a curing zone wherein the painted articles are subjected to an elevated temperature to bond the powder paint particles to the articles, a system for monitoring the painting process comprising:

a. sensing the weight of the delivery container and powder paint particles therein with scale means and generating a paint weight signal therewith corresponding to the real time weight of the delivery container and powder paint particles therein;

b. transmitting the paint weight signal from the scale means to computer-monitor means adaptable for displaying the real time weight of the delivery container and powder paint particles therein as a container weight function over a predetermined period of time;

c. sensing the speed of the conveyor line with speed sensing means and generating a line speed signal therewith corresponding to the real time line speed; and d. transmitting the line speed signal from the speed sensing means to computer-monitor means adaptable for displaying the real time line speed as a line speed function over a predetermined period of time.

18. The system of claim 17, further comprising:

e. sensing the pH of the recycled cleaning-surface activation solution with pH measuring means and generating a pH signal therewith corresponding to the real time pH of the recycled cleaning-surface activation solution;

f. transmitting the pH signal from the pH measuring means to computer-monitor means adaptable for displaying the real time pH of the recycled cleaning-surface activation solution as a pH function over a predetermined period of time;

g. sensing the elevated temperature in the curing zone with temperature sensing means and generating a temperature signal therewith corresponding to the real time elevated temperature in the curing zone; and h. transmitting the temperature signal from the temperature sensing means to computer-monitor means adaptable for displaying the real time temperature of the curing zone as a temperature function over a predetermined period of time.

19. In an electrostatic powder painting process having a conveyor line adaptable for transporting articles to be electrostatically powder painted sequentially through a plurality of zones in the process which include a precleaning-surface activation zone wherein the articles are precleaned and surface activated with a recycled cleaning-surface activation solution before painting, a rinse zone where articles leaving the precleaning-surface activation zone are rinsed to remove cleaning-surface activation solution from the articles, a drying zone where articles leaving the rinsing zone are dried, a painting zone wherein the dried articles are painted by dispensing powder paint particles from a delivery container through a conduit to an electrostatic powder paint spray gun operable for applying the powder paint particles to the articles, and a curing zone wherein the painted articles are subjected to an elevated temperature to bond the powder paint particles to the articles, a system for monitoring the painting process comprising:

a. sensing the weight of the delivery container and powder paint particles therein with scale means and generating a paint weight signal therewith corresponding to the real time weight of the delivery container and powder paint particles therein;

b. transmitting the paint weight signal from the scale means to computer-monitor means adaptable for displaying the real time weight of the delivery container and powder paint particles therein as a container weight function over a predetermined period of time;

c. sensing the speed of the conveyor line with speed sensing means and generating a line speed signal therewith corresponding to the real time line speed;

d. transmitting the line speed signal from the speed sensing means to computer-monitor means adaptable for displaying the real time line speed as a line speed function over a predetermined period of time;

e. sensing the pH of the recycled cleaning-surface activation solution with pH measuring means and generating a pH signal therewith corresponding to the real time pH of the recycled cleaning-surface activation solution;

f. transmitting the pH signal from the pH measuring means to computer-monitor means adaptable for displaying the real time pH of the recycled cleaning-surface activation solution as a pH function over a predetermined period of time;

g. sensing the elevated temperature of the curing zone at a plurality of sites in the curing zone with temperature sensing means and generating temperature signals therewith corresponding to the real time elevated temperature at each of the sites in the curing zone; and h. transmitting the temperature signals from the temperature sensing means to computer-monitor means adaptable for displaying the real time temperature of each of the sites in the curing zone as temperature functions over a predetermined period of time.

20. The system of claim 19, wherein the computer-monitor means for displaying the container weight function is also the computer-monitor means for displaying the line speed function, the computer-monitor means for displaying the pH function, and the computer-monitor means for displaying the temperature functions.

* * * * *